Oct. 21, 1924.   
G. F. ECKART  
1,512,833  
CHAIN CLASP  
Filed Oct. 14, 1922
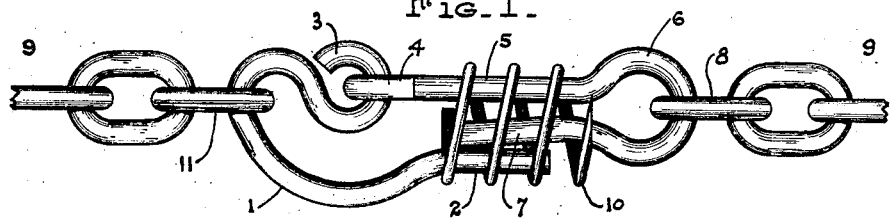
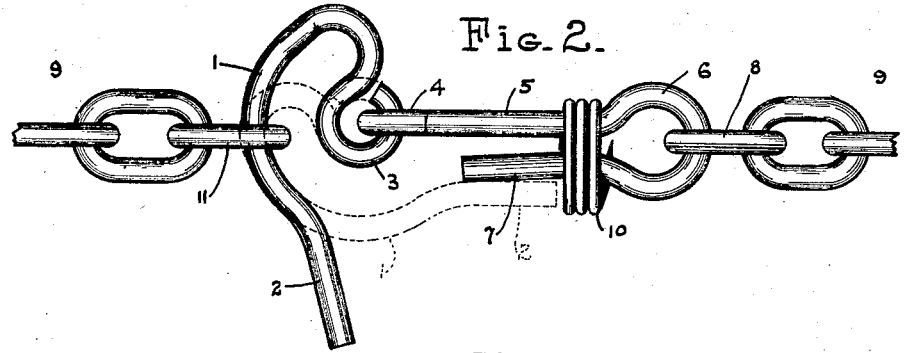
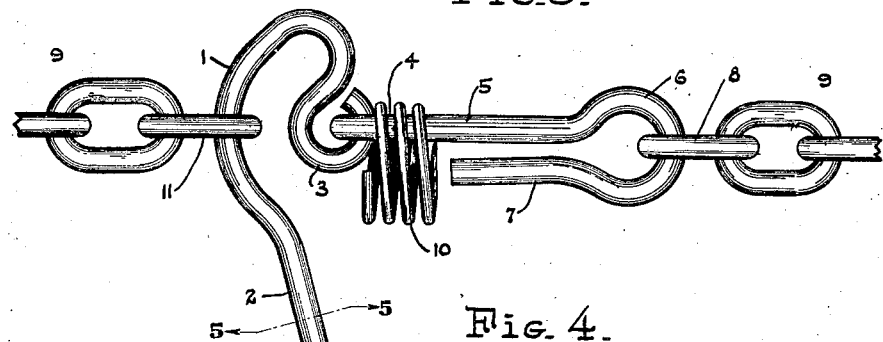
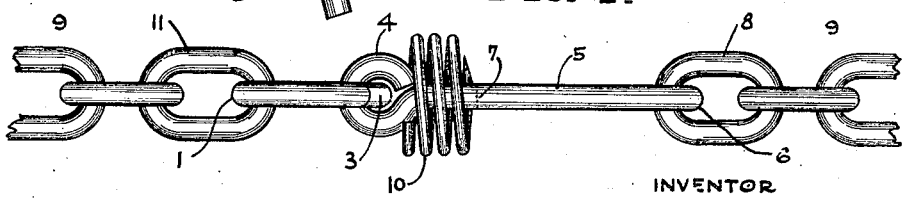
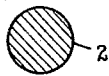
INVENTOR  
GEORGE F. ECKART  
BY *James N. Ramsey*  
ATTORNEY Patented Oct. 21, 1924.

1,512,833

UNITED STATES PATENT OFFICE.

GEORGE F. ECKART, OF NORWOOD, OHIO, ASSIGNOR OF SEVENTY PER CENT TO DAVID B. STRICKLING, OF CINCINNATI, OHIO.

CHAIN CLASP.

Application filed October 14, 1922. Serial No. 594,435.

*To all whom it may concern:*

Be it known that I, GEORGE F. ECKART, a citizen of the United States, residing at Norwood, in the county of Hamilton and State of Ohio, have invented certain new and useful Improvements in Chain Clasps, of which the following is a specification.

My invention relates to clasps which are particularly adapted for detachably connecting the ends of a chain or cable.

The objects of my invention are to provide a simple, convenient, economical and easily operated means for connecting and disconnecting the ends of chains, cables and the like.

My invention consists in the combination and arrangement of parts as herein set forth and claimed.

In the drawing:

Fig. 1 is a side elevation showing my invention in closed position connecting the ends of the chain;

Fig. 2 is a side elevation showing the hook disconnected from the spring and in position for inserting or removing it from the link of the chain;

Fig. 3 is a similar view showing the spring compressed against the eye of the hook to permit the clasp to be disconnected from the other end of the chain;

Fig. 4 is a plan view of Fig. 3; and

Fig. 5 is a cross section on the line 5—5 of Fig. 3.

In the embodiment of my invention as illustrated and which shows the preferred construction the clasp comprises a curved hook 1 having a straight projecting finger 2 on its free end and an eye 3 upon its other end engaging eye 4 upon one end of the open link 5 having eye 6 and projecting stem 7 on its other end.

Open link 5 is adapted to be detachably connected to end link 8 of chain 9 or any other link thereof as may be desired. Coil spring 10 is mounted upon open link 5 and when the clasp is in closed position it engages finger 2 of curved hook 1 as shown in Fig. 1. Projecting stem 7 is preferably disposed at an angle to the body of open link 5 gradually increasing in distance therefrom toward its free end for the purpose of more readily inserting link 8 of the chain. Curved hook 1 is adapted to be readily inserted in end link 11 of chain 9 or removed therefrom as shown in Fig. 2.

The operation of the device is as follows:

Open link 5 is connected to link 8 by compressing coil spring 10 to the position shown in Fig. 3 and inserting link 8 over projecting stem 7 and then drawing said link into eye 6. The spring is then permitted to expand to the position shown in Fig. 1. This forms a connection between the clasp and one end of the chain which is not to be disturbed except when removing the clasp entirely from the chain. To connect the hook to the other end of the chain compress spring 10 to the position shown in Fig. 2 so that finger 2 is entirely free to be moved upon its pivot to the position shown by dotted lines in Fig. 2. Insert finger 2 through link 11 as shown in Fig. 2 bringing it to the position shown in dotted lines in said figure, and then permitting spring 10 to expand to the position shown in Fig. 1. This will result in effectually and efficiently detachably connecting the ends of the chain. To disconnect the clasp from the chain simply reverse the operation.

This device possesses the advantages of extreme simplicity and convenience and quickness of operation and has no parts which are liable to work loose and become lost.

Another advantage of the invention is that the device can be operated to connect or disconnect the ends of a chain without any tools.

My invention constitutes an emergency clasp which is adapted for use for automobile tire chains.

What I claim as new and desire to secure by Letters Patent is:

1. In a clasp, a link having an eye in each end, a compressible coil spring thereon, a hook pivoted in one of said eyes and adapted to be retained in closed position by said coil spring when said spring is expanded and adapted to be opened from said closed position when said spring is compressed.

2. In a clasp, an open link having a closed eye at one end and an open eye at the other end with a stem projecting therefrom, a compressible coil spring around said link and a hook pivotally connected to said closed eye and adapted to be held in closed position by said coil spring and adapted to be opened from a closed position when said spring is compressed.

3. In a clasp, a link having an open end and a closed end, and a hook pivotally connected to said closed end and having a projecting end, a compressible coil spring around said link and when expanded adapted to retain said clasp in closed position by engaging said projecting end and when compressed adapted to disengage said projecting end and permit said clasp to be opened.

GEORGE F. ECKART.